(12) United States Patent
Draeger et al.

(10) Patent No.: US 6,941,221 B2
(45) Date of Patent: Sep. 6, 2005

(54) METHOD FOR SELECTING MAP INFORMATION, AND NAVIGATION DEVICE

(75) Inventors: Gerd Draeger, Braunschweig (DE); Lutz Kelch, Velchede (DE); Michael Busse, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 10/311,952

(22) PCT Filed: Jun. 18, 2001

(86) PCT No.: PCT/DE01/02204

§ 371 (c)(1),
(2), (4) Date: Aug. 12, 2003

(87) PCT Pub. No.: WO01/98734

PCT Pub. Date: Dec. 27, 2001

(65) Prior Publication Data

US 2004/0030495 A1 Feb. 12, 2004

(30) Foreign Application Priority Data

Jun. 19, 2000 (DE) .......................... 100 29 198

(51) Int. Cl.$^7$ .............................................. G06F 21/00
(52) U.S. Cl. ...................................................... 701/208
(58) Field of Search ................................ 701/200–202, 701/208; 340/988

(56) References Cited

FOREIGN PATENT DOCUMENTS

| EP | 0 246 452 | 11/1987 |
|----|-----------|---------|
| EP | 0 933 616 | 8/1999 |
| EP | 0 943 896 | 9/1999 |

*Primary Examiner*—Yonel Beaulieu
(74) *Attorney, Agent, or Firm*—Kenyon & Kenyon

(57) ABSTRACT

Proposed is a method and a navigation device, a method for selecting map information from a digital map on the basis of a predefined polyline being used on the digital map, and, in addition to the information defined by the polyline, the map information including further information regarding a route corridor.

6 Claims, 3 Drawing Sheets

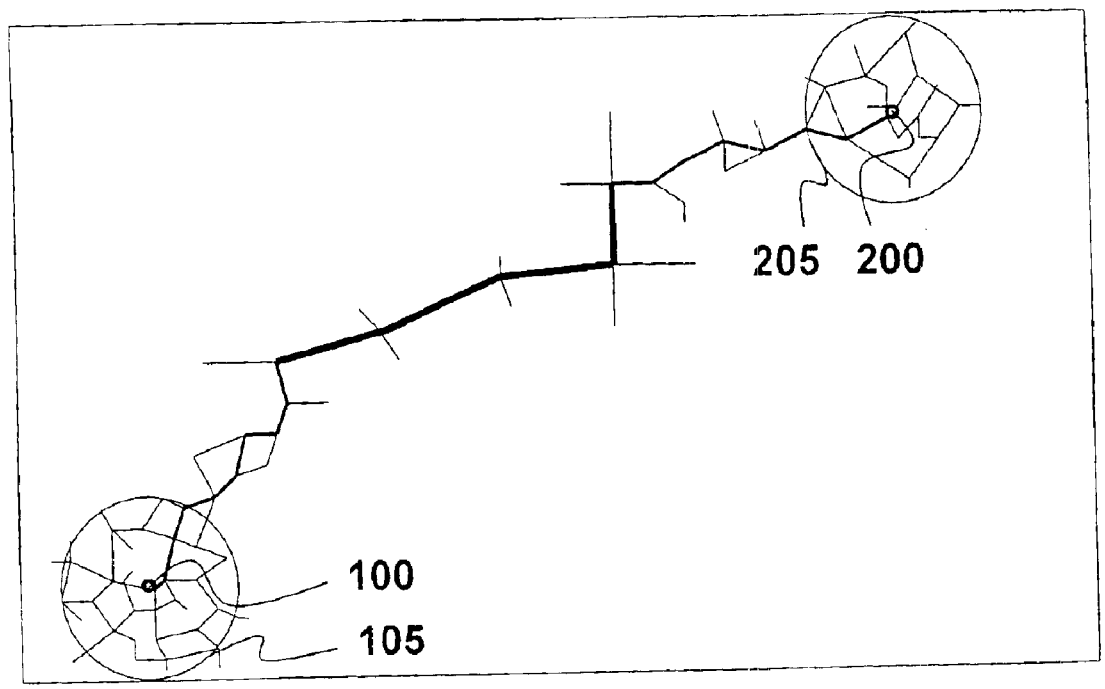
Figur.1
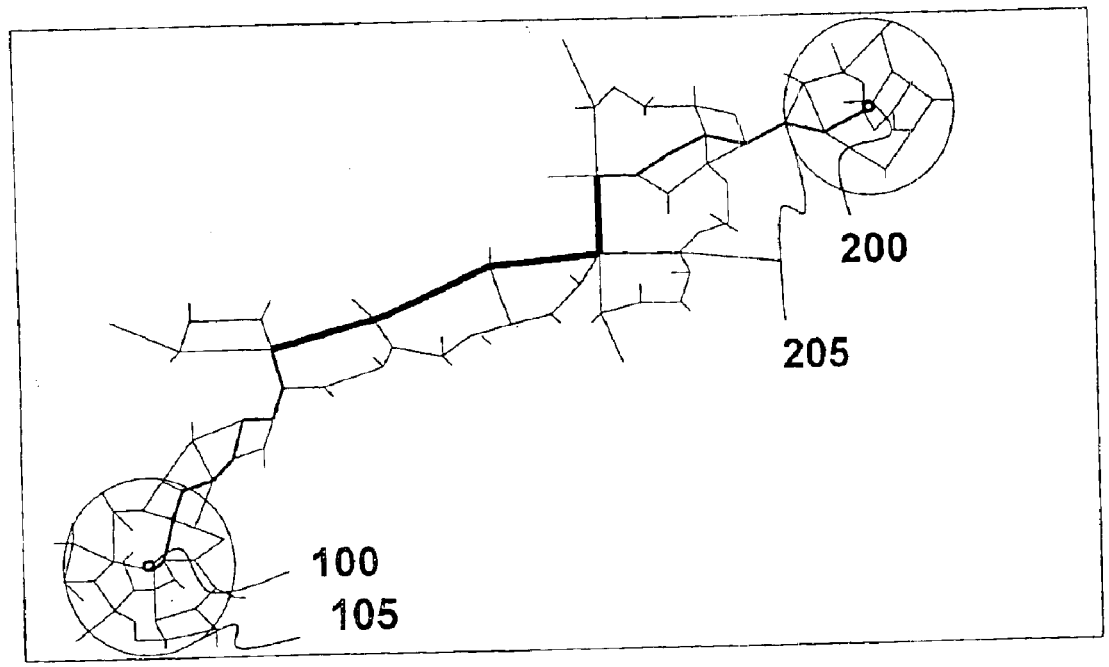
Figur.2

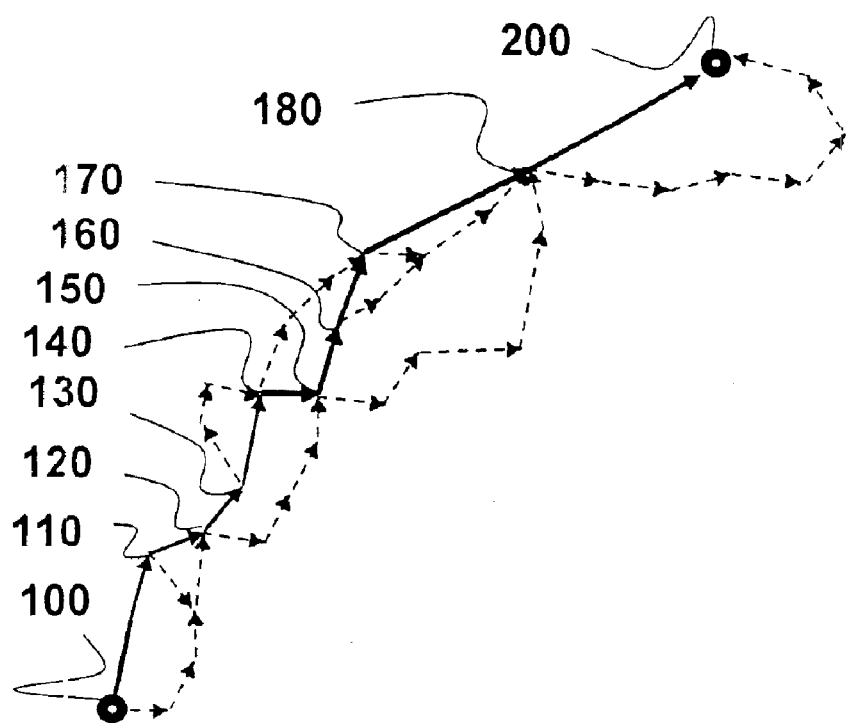
Figur 3
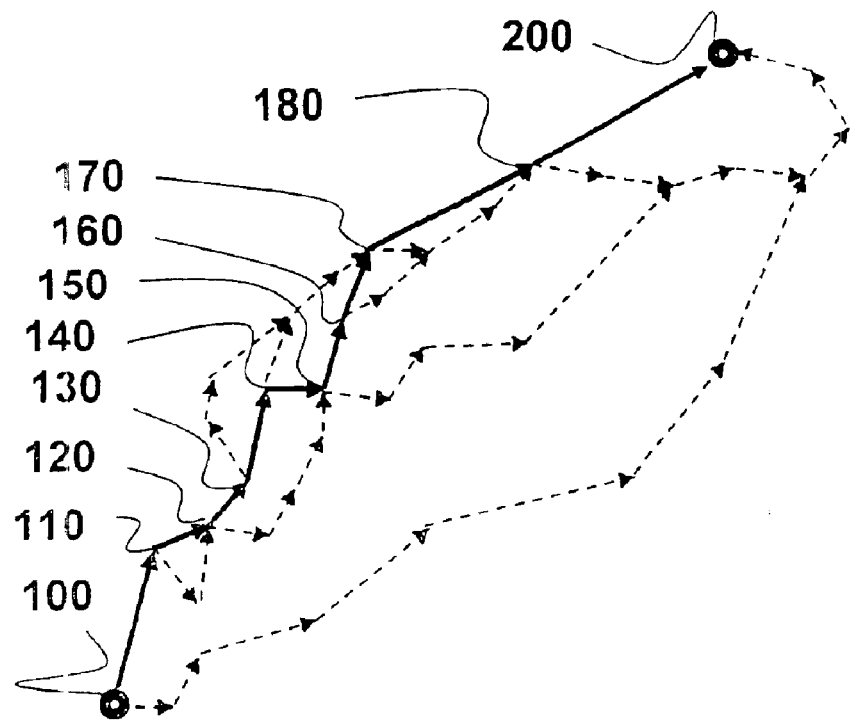
Figur 4

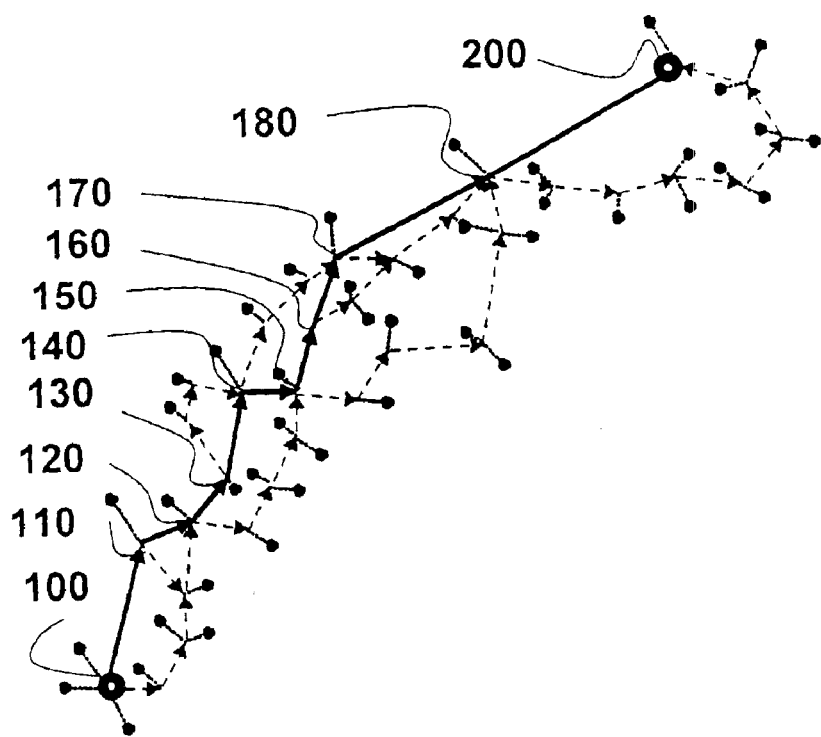
Figur. 5
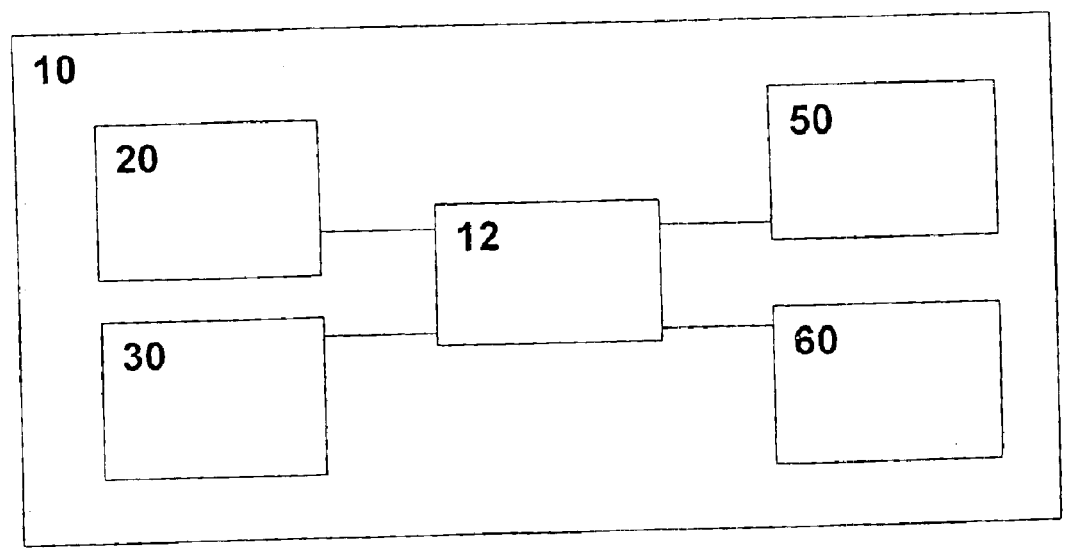
Figur 6

METHOD FOR SELECTING MAP
INFORMATION, AND NAVIGATION DEVICE

BACKGROUND INFORMATION

Today's vehicle navigation systems are essentially made up of the subsystems digital road map, computing module for calculating the route, position determination, system management, vehicle sensory system for detecting vehicle movements, and an input unit and an output unit for operating it and navigating. The digital road map is usually available on a storage medium, e.g. a navigation CD-ROM, in the vehicle. After the destination is input, the navigation system determines the route on the basis of the available map material. The calculated route is used for the navigation. If the driver leaves the current route during the trip, then the navigation device determines a new route on the basis of the current position.

SUMMARY OF THE INVENTION

The method of the present invention and the navigation device of the present invention, which possess the features of the dependent claims, have the advantage over the background art, that it is only necessary to access the map data which are also needed during navigation, and that it is not necessary to access the entire digital road map. In addition, it is advantageous that, during the use of a digital map in the vehicle, the complete route along with a corridor and any further information is present in the RAM, so that during the active navigation, basic data that are normally stored on a mass storage unit, such as a CD-ROM, do not have to be accessed. It is advantageous that, when the method of the present invention is used in a main station, basic data, i.e. a digital road map, first of all do not have to be available, e.g. on a CD-ROM, in the navigation device bound to the vehicle, and costly components may therefore be dispensed with, and second of all, the route corridor may constantly be generated in a main station from the newest map information. Therefore, the reduction in the amount of data constantly needed in comparison with a complete road map is advantageous, when only a corridor around a navigation route from the starting location of the navigation to the destination of the navigation is used. This allows a reduction in the costs, for example, for storage media, any transmission of the data, e.g. via an air interface, and the user fee for the map data, in particular in the case of a service provider. Furthermore, this advantageously increases the speed of accessing the elements of the route corridor, since the smaller amount of data allows the entire corridor to be stored in the quicker RAM.

In addition, it is advantageous that the at least one parameter provides for the selected map information being tolerant of one error or tolerant of two errors, and/or being tolerant of multiple errors in the starting region and destination region of the polyline. This provides a sufficient amount of information for returning to the planned route in an optimum manner, when one or two and/or, in the starting and destination regions, several issued driving instructions are not followed. This does increase the amount of information regarding the route corridor, but increases the flexibility of the information for the purposes of navigation, which results, on the whole, in an advantage.

In addition, it is advantageous that the at least one parameter provides for the selected map information being tolerant of one, two, or multiple errors as a function of the class of road. In this manner, the amount of information to be provided in the route corridor is not unnecessarily increased by a generally high error tolerance, because a larger error tolerance is set for parts of the main route shown by experience to be prone to error (e.g. a standing area or urban area), than for parts shown by experience to be less prone to error (such as freeways).

In addition, is advantageous that the at least one parameter provides for the selected map information containing navigational instructions. Therefore, route corridors according to the present invention and map information selected according to the present invention may also be used in navigation systems, which do not determine their own route. This is rendered possible by storing the navigational instructions in the corridor or in the selected map information. However, a route determination may still be carried out inside the corridor, since all of the relevant map data are still present.

Furthermore, it is advantageous that the navigational instructions lead back to the polyline on the shortest, quickest, or most efficient route (side route) and/or lead to the destination (alternate route). In this manner, a more or less extensive route corridor may be generated, depending on what a user desires.

BRIEF DESCRIPTION OF THE DRAWING

An exemplary embodiment of the present invention is represented in the drawing and explained in detail in the following description. The figures show:

FIG. 1 a representation of a first example of a route corridor according to the present invention;

FIG. 2 a representation of a second example of a route corridor according to the present invention;

FIG. 3 a representation of a third example of a route corridor according to the present invention;

FIG. 4 a representation of a fourth example of a route corridor according to the present invention;

FIG. 5 a representation of a fifth example of a route corridor according to the present invention; and FIG. 6 a navigation device according to the present invention.

DESCRIPTION OF THE EXEMPLARY
EMBODIMENTS

The present invention describes a method by which a route corridor is generated from a known route, the route corridor having the feature that, in addition to the actual main route that includes, inter alia, the road segments of the original map, other road segments on which the navigation device may navigate are considered. The "width" of the route corridor or the number of additional road elements or road segments is generated according to predefined parameters, such as the tolerated number of instances of erroneous driving. Apart from the road segments, which are selected from the digital map and may be used for a route calculation inside the corridor, navigational instructions are alternatively or additionally generated for sections of road. Depending on the setting of the parameters for implementing the method, the present invention provides for these instructions to be generated, e.g. in such manner, that they either lead one back to the original main route on a side route leading after some time, or that they navigate along an alternate route. In this connection, the main route, the side route, or the alternate route may overlap any number of times, i.e. the main route and/or one or more side routes may be included in the alternate route, and vice versa.

The navigational instructions in an alternate route may be generated in such a manner, that the vehicle is guided on the best route to the destination. This normally results in the navigational instructions leading the driver back to the main route again. However, it may also be provided and desirable, that the driver be lead on a completely different, alternate route to the destination, since a completely new route to the destination was found from this point.

Since, as a rule, the best side route after driving incorrectly is a turning maneuver back to the main route, the first part of the road may be alternatively provided with a high driving resistance for the route-determination algorithm while generating the route corridor. Therefore, a side route or alternate route is primarily determined, which does not lead back directly to the main route by way of a turning maneuver.

From a known, predetermined main route or polyline, which is matched to a digital map, i.e. a digital map is fit to the route or polyline, the method of the present invention generates a route corridor according to one or more criteria or parameters of the present invention. A possible criterion of the present invention is referred to as "tolerance for one error". This means that the driver is always conceded exactly one incorrect driving maneuver, if he is on the calculated route, i.e. if he is on the main route. As soon as he does not follow a navigational instruction, he departs from the proposed main route, but he continues to be guided to the destination, as, after a short time, he is guided again to the main route via a side route, or guided on an alternate route to the destination. In this case, a route that leads from the point on the main route, at which the main route was exited, to the next convenient point of access to the main route is designated as a side route. A route that specifies the best, i.e. either the shortest or the quickest or the most efficient route to the navigation destination is referred to as an alternate route.

Therefore, the method according to the present invention first of all calculates the route corridor from a main route, i.e. from a selected polyline, and secondly, from a digital map that is stored, for example, on a navigational CD-ROM. In this context, the main route is determined by an arbitrary method, e.g. a navigation algorithm in a navigation device, which is installed in a vehicle or in a main station at a service provider. In particular, the number of tolerated errors is preselected, an expanded starting region is defined, and an expanded destination region is defined, as parameters for controlling the implementation of the method according to the present invention. This information is likewise made available to the method of the present invention. The expanded starting and destination regions are regions around a starting point or destination point, in which the route corridor or the selected map information completely contains the digital map.

The corridor is placed about the selected route regardless of the method used for determining a route (criteria of speed, time-efficiency, etc.). The corridor is generated in such a manner, that additional road segments from a map database are added to the existing roads or route elements at the nodes (intersections). The number of road segments added may be specified by inputting at least one of the following parameters: Specification of the error tolerance, detail areas in the starting and destination regions, error tolerance as a function of the class of road. Tolerant of one error means that the driver may be given a navigational instruction despite making a wrong turn. Tolerant of two errors means, that either the driver may make two wrong turns in direct succession and also still be given a driving instruction, or that the driver may make a wrong turn on both the main route and a side/alternate route and also still be given a driving instruction. In the event of another error, the vehicle may be situated outside the corridor. In this context, it is conceivable for the selected error tolerance to be a function of the underlying class of road. Thus, a higher error tolerance may be granted in urban areas than on freeways.

Starting or destination regions may optionally be generated as a complete map section, since, in the starting region or destination region, which is normally a municipal area, the probability of not being able to follow the instructions of the navigation device is highest. In the area of the starting region, a complete map section may accelerate the initialization of a map-matching algorithm. In addition, a map is provided in the destination region for pedestrian navigation.

Shown in FIG. 1 is a representation of a first example of a route corridor according to the present invention. A starting point 100 and a destination point 200 are specified, as well as a starting region and a destination region, the starting region being denoted by a circle provided with reference numeral 105, and the destination region being specified by a circle referred to by reference numeral 205. The route or the predetermined polyline is represented by the bold-faced lines in FIG. 1. In FIG. 1, it is apparent that not only the bare polyline is represented, but also options for turning off, which are displayed as lines of normal width along the main route, i.e. along the polyline.

Shown in FIG. 2 is a representation of a second example of a route corridor according to the present invention. Starting point 100, destination point 200, expanded starting region 105, and expanded destination region 205 are again shown.

However, in contrast to the first example of a route corridor according to present invention, the route corridor in the second example includes, in addition to the turn-offs from the main route, branch loops of the digital map connecting to the main route.

FIG. 3 shows a third exemplary embodiment of a route corridor according to the present invention. A first arrow points from starting point 100 towards a first intermediate point 110. A second arrow points from first intermediate point 110 to a second intermediate point 120. A third arrow points from second intermediate point 120 to a third intermediate point 130. A third arrow points from third intermediate point 130 to a fourth intermediate point 140. A fifth arrow points from fourth intermediate point 140 to a fifth intermediate point 150. A sixth arrow points from fifth intermediate point 150 to a sixth intermediate point 160. A seventh arrow points from sixth intermediate point 160 to a seventh intermediate point 170. An eighth arrow points from seventh intermediate point 170 to an eighth intermediate point 180. A ninth arrow points from eighth intermediate point 180 to destination point 200. The first, second, third, fourth, fifth, sixth, seventh, eighth, and ninth arrows are parts of the main route, just as intermediate points 110 through 180. In addition to the arrows of the main route, other arrows are represented in FIG. 3 by dotted lines. These belong to side routes. In the case of navigating a motor vehicle, for example, it may be preferred that the vehicle remain on the main route from starting point 100 to destination point 200. If, however, this is not the case due to various reasons, e.g. when the driver does not follow an instruction of the navigation system, then a navigation system needs information above and beyond the information included in the polyline. To this end, the present invention provides the route corridor, which includes the necessary information. According to the present invention, the route corridor includes variable amounts of information as a function of the parameters for implementing the method. Depending on how the parameters of the method are set, the route corridor may include a side route which is designed to guide one on the quickest route from the point of deviating from the main route, back to the main route. Arrows represented as dotted lines are provided in FIG. 3 for the purpose of illustrating these circumstances. The arrows, i.e. both the arrows of the main route and the arrows of the side routes, correspond to navigational instructions. Therefore, when the route corridor according to the third example of a route corridor is supplied to a navigation system not able to calculate its own route, then the navigation system may reach destination 200 with the aid of the navigational instructions. When the navigation system supports its own route determination, then the data of the route corridor are used in a known manner to determine the most suitable route to the destination, the navigational instructions being generated in the course of such a route determination, from the information present in the route corridor. Then, navigational instructions would not be necessary (but also not a hindrance) in the route corridor as such, so that, according to the present invention, the arrows represented in the third example of a route corridor are also provided as mere connecting lines without the direction information. In this connection, is particularly useful that the present invention provides for the user, i.e. in particular a vehicle, not being guided to the destination by a turning maneuver immediately following the departure from the main route. Therefore, is useful for the present invention to assign, from the point of departure from the main route, a high driving resistance to a number of road segments of the main route during the recalculation of the route, in order to prevent the vehicle from being navigated directly to the main route again, i.e. using a turning maneuver. This renders an algorithm for route determination more independent of the originally planned course of the route between the starting point and the destination point, i.e. more independent of the main route.

In order to generate the navigational instruction, the part of the main route, on which the driver would have traveled next, may alternatively be assigned a driving resistance as well, for the determination of a side route or alternate route. Since the driver does not normally leave the main route without a reason, an example being the departure from the main route on account of a traffic jam lying ahead, this method has the advantage that one is not necessarily returned to the main route at the next opportunity, but rather according to the selected route-determination criteria, in particular the shortest, most rapid, and most efficient trip, and that the driving resistances are weighed out. Therefore, this normally yields a side route or alternate route, which travels completely around the part of the main route blocked by the driving resistance.

A fourth exemplary embodiment of a route corridor according to the present invention is represented in FIG. 4. The parts of the main route and intermediate points 110 through 180 are again represented here. In addition, alternate routes are made up of arrows represented by dotted lines. The parameters for implementing the method according to the present invention are therefore set for generating the fourth example of a route corridor in such a manner that, in the event of departures from the main route, not the side routes, but rather the alternate routes are integrated into the route corridor. The arrows also symbolize navigational instructions in the fourth example of the route corridor according to the present invention.

A fifth example of a route corridor according to the present invention is represented in FIG. 5. In addition to the arrows of the main route (solid arrows) and the arrows of the side routes and alternate routes (dotted arrows), in each case, the first road sections branching off are also represented in FIG. 5, using short, dotted lines ending in a point, i.e. the route corridor according to the fifth example also includes information about the road segments still present at an arbitrary point, which are outside the curve of the main route, the side routes, and the alternate routes. The road sections branching off allow reliable differentiation between the states of the driver driving correctly or incorrectly with respect to the driving instructions.

A navigation device 10 or also a navigation system 10 according to the present invention is represented in FIG. 6. the Navigation device 10 includes a memory 20, which especially takes the form of a main memory and is rewritable. Memory 20 is, in particular, a memory device having rapid access. Navigation device 10 also includes a route-determination unit 30 and a control unit 12. Using position-finding data supplied to navigation device 10 by a position-finding unit not shown, and using destination information, route-determination unit 30 converts information coming from a digital map into navigational instructions, which are stored, e.g. in memory 20, the storage being controlled by control unit 12. Route-determination unit 30 is optionally present.

In addition, the navigation device includes a mass storage unit 50 and/or an air interface 60. A digital map may be stored in the mass storage unit, in particular in the form of a CD-ROM. Information from navigation device 20 is transmitted and/or received via the air interface. The received information includes, in particular, information that a service provider not shown transmits to the navigation device as a part of the digital map, in particular in the form of a route corridor. The navigation system may demand map information or other information from a main station, e.g. a service provider, via air interface 60.

Main memory 20 stores data for a current navigation operation. When a mass storage unit is present, a route determination is carried out on the digital map in the mass storage unit, the digital map of mass storage unit 50 having to be accessed in response to each deviation from the route determination, if only the information regarding the main route is available. According to the present invention, the mass storage unit is accessed only once and a main route is defined. A route corridor is generated for this main route and stored in main memory 20. Access to mass storage unit 50 is then no longer necessary for the same navigation guidance.

In the case in which a mass storage unit 50 is absent, the same applies to the communication with a main station of a service provider via air interface 60. The inquiry including the relevant starting data and destination data of the navigation is transmitted to the service provider, and the service provider does not only transmit the main route to the navigation unit or navigation device, but also transmits the route corridor of the present invention, so that a new inquiry to the service provider is not necessary in the case of a deviation from the main route provided.

In the navigation device, navigational instructions are used when it is possible to calculate the route, or the navigational instructions present in the route corridor as a function of the parameter setting of the method according to the present invention are used in the event that the route-determination device is absent.

What is claimed is:

1. A method for selecting map information from a digital map, comprising:

providing a predefined polyline that defines information;

selecting map information that includes a route corridor as a function of at least one parameter; and if the at least one parameter provides for the selected map information being tolerant of an error, guiding a driver on one of a side route and an alternate route, wherein one of:

the at least one parameter provides for the selected map information to be tolerant of multiple errors in a starting region and a destination region of the predefined polyline, and the at least one parameter provides for the selected map information to be tolerant of at least one error as a function of a class of a road.

2. The method according to claim 1, wherein the at least one parameter provides for the selected map information to include a navigational instruction.

3. The method according to claim 1, further comprising:

formatting the navigational instruction to lead back to at least one of a destination via the alternate route and to the predefined polyline on one of a shortest route, a quickest route, and a most efficient route.

4. A method of using a navigation device including a memory and a navigation computer, comprising:

a storing in a memory selected map information, the selected map information being selected by:

providing a predefined polyline that defines information, selecting map information that includes a route corridor as a function of at least one parameter, and if the at least one parameter provides for the selected map information being tolerant of an error, guiding a driver on one of a side route and an alternate route, wherein one of:

the at least one parameter provides for the selected map information to be tolerant of multiple errors in a starting region and a destination region of the predefined polyline, and the at least one parameter provides for the selected map information to be tolerant of at least one error as a function of a class of a road; and causing the navigation computer to generate a navigational instruction.

5. The method according to claim 4, wherein the at least one parameter provides for the selected map information to include a navigational instruction.

6. The method according to claim 5, further comprising:

formatting the navigational instruction to lead back to at least one of a destination via the alternate route and to the predefined polyline on one of a shortest route, a quickest route, and a most efficient route.

* * * * *

UNITED STATES PATENT AND TRADEMARK OFFICE
CERTIFICATE OF CORRECTION

PATENT NO.      : 6,941,221 B2
APPLICATION NO. : 10/311952
DATED           : September 6, 2005
INVENTOR(S)     : Gerd Draeger et al.

It is certified that error appears in the above-identified patent and that said Letters Patent is hereby corrected as shown below:

On the TITLE PAGE, # (57) Abstract, line 1, change "Proposed is a method" to --A method--

On the TITLE PAGE, # (57) Abstract, line 6, change "corridor." to --corridor and a navigation device wherein the map information is stored in the memory, and wherein the navigational instructions are usable for navigation.--

Column 1, line 7, change "Today's vehicle navigation systems are essentially made" to --Vehicle navigation systems are conventionally made--

Column 1, line 22, change "The method of the present invention" to --According to the method--

Column 1, lines 23-25, delete "which possess … background art,"

Column 1, line 25, change "that it is only necessary" to --it may only be necessary--

Column 1, line 26, change "which are also needed" to --which are needed--

Column 1, line 26, change "and that it is not" to --and it may not be--

Column 1, line 27, delete "it is advantageous that,"

Column 1, line 32, change "It is advantageous that, when" to --When--

Column 1, line 34, delete "first of all"

Column 1, line 37, delete "and second of all,"

Column 1, line 39, delete "reduction in the"

Column 1, lines 40-41, change "is advantageous," to "may be reduced"

Column 1, line 43, change "This allows" to --This may allow--

Column 1, line 46, change "in particular" to --for example,--

Column 1, line 47, change "this advantageously increases" to --this may increase--

Column 1, line 50, change "data allows" to --data may allow--

UNITED STATES PATENT AND TRADEMARK OFFICE
CERTIFICATE OF CORRECTION

| | |
|---|---|
| PATENT NO. | : 6,941,221 B2 |
| APPLICATION NO. | : 10/311952 |
| DATED | : September 6, 2005 |
| INVENTOR(S) | : Gerd Draeger et al. |

It is certified that error appears in the above-identified patent and that said Letters Patent is hereby corrected as shown below:

Column 1, line 52, delete "it is advantageous that"

Column 1, line 53, change "provides for" to --may provide for--

Column 1, line 53, change "information being" to --information to be--

Column 1, line 60, change "This does increase" to --This may increase--

Column 1, line 61, change "but increases" to --but may also increase--

Column 1, lines 62-63 , change "purposes of navigation, which results, on the whole, in an advantage." to --purposes of navigation.--

Column 1, line 64, delete "it is advantageous that"

Column 1, line 65, change "provides for" to --may provide for--

Column 1, line 65, change "information being" to --information to be--

Column 2, line 8, change "provides for" to --may provide for--

Column 2, line 17, delete "it is advantageous that"

Column 2, line 18, change "instructions lead back" to --instructions may lead back--

Column 2, line 24, change "...OF THE DRAWING" to -- ...OF THE DRAWINGS--

Column 2, lines 26-28, delete "An exemplary ... The figures show:"

Column 2, line 29, change "FIG. 1 a ... first example of" to --FIG. 1 illustrates a ... first exemplary embodiment of--

Column 2, line 31, change "FIG. 2 a ... first example of" to --FIG. 2 illustrates a ... first exemplary embodiment of--

Column 2, line 33, change "FIG. 3 a ... first example of" to --FIG. 3 illustrates a ... first exemplary embodiment of--

Column 2, line 35, change "FIG. 4 a ... first example of" to --FIG. 4 illustrates a ... first exemplary embodiment of--

UNITED STATES PATENT AND TRADEMARK OFFICE
CERTIFICATE OF CORRECTION

PATENT NO. : 6,941,221 B2
APPLICATION NO. : 10/311952
DATED : September 6, 2005
INVENTOR(S) : Gerd Draeger et al.

It is certified that error appears in the above-identified patent and that said Letters Patent is hereby corrected as shown below:

Column 2, line 37, change "FIG. 5 a … first example of" to --FIG. 5 illustrates a … first exemplary embodiment of--

Column 2, line 39, change "FIG. 6 a" to --FIG. 6 illustrates a--

Column 2, line 39, change "according to the present" to --according to an exemplary embodiment of the present--

Column 2, line 45, change "is generated" to --may be generated--

Column 2, line 46, change "having the feature that," to --where,--

Column 3, line 16, change "which is matched" to --an exemplary embodiment of which is matched--

Column 3, line 35, change "the method" to --an exemplary embodiment of the method--

Column 3, line 36, change "first of all calculates" to --first calculates--

Column 3, line 37, change "and secondly," to --and second,--

Column 3, line 39, change "route is determined" to --route may be determined--

Column 3, line 42, change "in particular," to --for example,--

Column 3, line 42-43, change "is preselected," to --may be preselected,--

Column 3, line 46, change "is likewise made" to --may be likewise made--

Column 3, line 54, change "The corridor is generated" to --The corridor may be generated--

Column 3, line 59, change "Specification" to --specification--

Column 3, line 60, change "error tolerance" to --and error tolerance--

Column 4, line 14, change "a first example of" to --a first exemplary embodiment of--

Column 4, line 26, change "a second example" to --a second exemplary embodiment of--

UNITED STATES PATENT AND TRADEMARK OFFICE
CERTIFICATE OF CORRECTION

| | | |
|---|---|---|
| PATENT NO. | : 6,941,221 B2 | |
| APPLICATION NO. | : 10/311952 | |
| DATED | : September 6, 2005 | |
| INVENTOR(S) | : Gerd Draeger et al. | |

It is certified that error appears in the above-identified patent and that said Letters Patent is hereby corrected as shown below:

Column 4, line 58, change "it may be preferred that the vehicle" to --the vehicle may--

Column 4, line 64, change "the present invention" to --the exemplary embodiment of the present invention--

Column 5, line 16, change "in a known manner" to --in a conventional manner--

Column 5, line 24, change "is particularly useful" to --it may be useful--

Column 5, line 26, change "in particular a vehicle," to --for example, a vehicle,--

Column 5, line 45, change "has the advantage" to --provides--

Column 6, line 13, change "in the present invention" to --in an exemplary embodiment of the present invention--

Column 6, line 14, change "the Navigation device" to --The Navigation device--

Column 6, line 15, change "especially takes the form" to --may take the form--

Column 6, line 16, change "in particular," to --for example,--

Column 6, line 20, change "finding unit not shown," to --finding unit,--

Column 6, line 28, change "in particular in" to --for example, in--

Column 6, line 31, change "in particular, information" to --for example, information--

UNITED STATES PATENT AND TRADEMARK OFFICE
CERTIFICATE OF CORRECTION

PATENT NO. : 6,941,221 B2
APPLICATION NO. : 10/311952
DATED : September 6, 2005
INVENTOR(S) : Gerd Draeger et al.

It is certified that error appears in the above-identified patent and that said Letters Patent is hereby corrected as shown below:

Column 6, line 33, change "in particular in the form" to --for example, in the form--

Signed and Sealed this

First Day of August, 2006

JON W. DUDAS
*Director of the United States Patent and Trademark Office*